US009275241B2

(12) United States Patent
Meister

(10) Patent No.: US 9,275,241 B2
(45) Date of Patent: Mar. 1, 2016

(54) CRYPTOGRAPHIC METHOD

(75) Inventor: Gisela Meister, Munich (DE)

(73) Assignee: GIESECKE & DEVRIENT GMBH, Munich (DE)

(*) Notice: Subject to any disclaimer, the term of this patent is extended or adjusted under 35 U.S.C. 154(b) by 249 days.

(21) Appl. No.: 13/996,747

(22) PCT Filed: Dec. 21, 2011

(86) PCT No.: PCT/EP2011/006491
§ 371 (c)(1),
(2), (4) Date: Aug. 15, 2013

(87) PCT Pub. No.: WO2012/084241
PCT Pub. Date: Jun. 28, 2012

(65) Prior Publication Data
US 2013/0326235 A1 Dec. 5, 2013

(30) Foreign Application Priority Data

Dec. 22, 2010 (DE) .................. 10 2010 055 699

(51) Int. Cl.
G06F 21/60 (2013.01)
H04L 9/08 (2006.01)
H04L 9/32 (2006.01)
H04L 29/06 (2006.01)

(52) U.S. Cl.
CPC ............ *G06F 21/602* (2013.01); *H04L 9/0841* (2013.01); *H04L 9/3226* (2013.01); *H04L 63/061* (2013.01); H04L 2463/061 (2013.01)

(58) Field of Classification Search
CPC ....... G06F 21/44; G06F 21/602; H04L 9/006; H04L 9/0825; H04L 9/3263; H04L 63/0442
See application file for complete search history.

(56) References Cited

U.S. PATENT DOCUMENTS

| 5,651,068 | A | * | 7/1997 | Klemba | G06F 21/602 235/380 |
| 5,721,781 | A | * | 2/1998 | Deo et al. | 705/67 |
| 5,818,738 | A | * | 10/1998 | Effing | 702/117 |
| 6,336,183 | B1 | * | 1/2002 | Le | G06F 9/3834 712/208 |
| 6,336,188 | B2 | * | 1/2002 | Blake-Wilson et al. | 713/171 |
| 6,430,690 | B1 | * | 8/2002 | Vanstone et al. | 713/182 |

(Continued)

FOREIGN PATENT DOCUMENTS

CN 1889433 A 1/2007

OTHER PUBLICATIONS

Paul Oorschot, "Authentication and Authenticated Key Exchanges", Designs, Codes and Cryptography, 2, pp. 107-125 (1992).*

(Continued)

*Primary Examiner* — Hadi Armouche
*Assistant Examiner* — Sher A Khan
(74) *Attorney, Agent, or Firm* — Workman Nydegger

(57) ABSTRACT

In a cryptographic method between a portable data carrier and a terminal device there are employed a public data-carrier key and a secret data-carrier key of the data carrier as well as a public terminal key and a secret terminal key of the terminal device. The data carrier employs as a public data-carrier key a static public key. As a secret data-carrier key the data carrier employs a secret key that is derived from a secret basic key associated with the public data-carrier key. Within the framework of the method, the terminal device checks an authentication parameter associated with the data carrier and different from the data-carrier keys.

16 Claims, 4 Drawing Sheets

(56) References Cited

U.S. PATENT DOCUMENTS

| | | | | |
|---|---|---|---|---|
| 6,539,092 | B1* | 3/2003 | Kocher | G06Q 20/341 380/1 |
| 6,789,197 | B1* | 9/2004 | Saito | G06F 21/10 348/E5.004 |
| 7,529,369 | B2* | 5/2009 | Guterman | 380/44 |
| 7,814,317 | B1* | 10/2010 | Matthews et al. | 713/165 |
| 8,165,301 | B1* | 4/2012 | Bruce et al. | 380/277 |
| 2001/0016908 | A1 | 8/2001 | Blake-Wilson et al. | |
| 2002/0138733 | A1* | 9/2002 | Ishibashi | G06Q 20/00 713/176 |
| 2002/0164035 | A1* | 11/2002 | Yokota et al. | 380/278 |
| 2003/0144963 | A1* | 7/2003 | Saito | G06F 21/10 705/57 |
| 2005/0169475 | A1* | 8/2005 | Camus | G06F 21/602 380/252 |
| 2006/0098824 | A1* | 5/2006 | Mao | 380/282 |
| 2006/0168580 | A1* | 7/2006 | Harada | G06F 21/10 717/174 |
| 2007/0083750 | A1* | 4/2007 | Miura et al. | 713/155 |
| 2008/0022121 | A1 | 1/2008 | Fu et al. | |
| 2008/0109661 | A1* | 5/2008 | Sotoodeh | 713/191 |
| 2008/0301461 | A1 | 12/2008 | Coulier et al. | |
| 2009/0022309 | A1* | 1/2009 | Vanstone et al. | 380/28 |
| 2009/0097637 | A1* | 4/2009 | Boscher et al. | 380/28 |

OTHER PUBLICATIONS

Bellovin, Steven M. et al., "Encrypted Key Exchange: Password-Based Protocols Secure Against Dictionary Attacks", Proceedings of the 1992 IEEE Computer Society Symposium on Research in Security and Privacy, 1992. pp. 72-84.

Diffie, Whitfield, "Authentication and Authenticated Key Exchanges", Designs, Codes and Cryptography, vol. 2, Jun. 1992. pp. 107-125.

German Search Report from DE Application No. DE 10 2010 055 699.8, Feb. 11, 2014.

International Search Report in PCT/EP2011/006491, Apr. 12, 2012.

International Preliminary Report on Patentability & Written Opinion in PCT/EP2011/006491, Jun. 25, 2013.

Kiyomoto, Shinsaku et al., "Anonymous Attribute Authentication Scheme Using Self-Blindable Certificates", KDDI R&D Laboratories Inc., Intelligence and Security Informatics ISI 2008, Jun. 17-20, 2008, pp. 215-217.

* cited by examiner

CRYPTOGRAPHIC METHOD

BACKGROUND OF THE INVENTION

The present invention relates to a cryptographic method between a portable data carrier and a terminal device, and to an accordingly adapted data carrier and a terminal device.

A portable data carrier, for example in the form of an electronic identity document, comprises an integrated circuit with a processor and a memory. The memory stores data relating to a user of the data carrier. On the processor there can be executed a cryptography application via which the data carrier can set up a secure communication connection with the terminal device. Further, the cryptography device can support an authentication of the data carrier to the terminal device, in the case of an identity document for example upon a border control or the like.

During such a cryptographic method, a secure data communication between the data carrier and the terminal device is prepared by a secret communication key for symmetric encryption of a subsequent data communication being agreed on, for example by means of the well-known Diffie-Hellman key exchange method or other suitable methods. Further, at least the terminal device normally verifies the authenticity of the data carrier, for example using a certificate.

For carrying out a method for agreeing on the secret communication key, it is necessary that the terminal as well as the data carrier respectively supply a secret key and a public key. The certificate of the data carrier can relate for example to its public key.

Different methods and protocols are known which support the setup of a secure communication connection between a portable data carrier and a terminal device. A key exchange method based on session-specifically dynamically generated keys can be additionally secured in a password-based manner. The password used may be a secret datum, for example a PIN, a biometric feature, e.g. a fingerprint, or the like. The password is normally stored in the data carrier, on the one hand, and supplied to the terminal device in a suitable manner in the course of the method, on the other hand. The password can be input to the terminal device e.g. by a user of the data carrier by means of an input device, for example by means of a keyboard, a sensor for biometric data, or the like. According to another embodiment, the password, for example a PIN, can be applied to the data carrier so as to be optically readable and be sensed accordingly by the terminal device. Thus it is ensured that a legitimate user of the data carrier approves the use of the data carrier within the framework of the method, by inputting the password or at least presenting the data carrier such that the password can be read out by the terminal device. An unwanted data communication, for example by contactless means, can thus be ruled out. However, such a method does not enable a mutual authentication of data carrier and terminal.

Known methods for authenticating a data carrier to the terminal device or for authenticating the terminal device to the data carrier cannot provide the security of password-based methods, however. Such authentication methods are based for example on the employment of digital certificates.

SUMMARY OF THE INVENTION

A cryptographic method between a portable data carrier and a terminal device, according to the invention, employs a public data-carrier key and a secret data-carrier key of the data carrier as well as a public terminal key and a secret terminal key of the terminal device. The data carrier employs as a public data-carrier key a static public key, in particular a public group key. As a secret data-carrier key, the data carrier employs a secret key that is derived from a secret basic key associated with the public data-carrier key. According to the invention, the terminal device checks an authentication parameter associated with the data carrier and different from the data-carrier keys.

This authentication parameter can be given for example by a password, a biometric feature of a user of the data carrier, or by an individual feature of the data carrier. The authentication parameter is stored securely in the data carrier. The authentication parameter can be supplied to the terminal device within the framework of the method in different ways. On the one hand, a user of the data carrier can input the authentication parameter to the terminal device via a suitable input device, a PIN for example via a keyboard, a biometric feature e.g. via a corresponding sensor. On the other hand, the authentication parameter can be applied to the data carrier so as to be optically readable, and be read out by the terminal device when the data carrier is presented suitably to the same.

In the method according to the invention it is no longer necessary to store the secret basic key in the data carrier. Therefore, such key cannot be spied out upon an attack on the data carrier. In particular, those further data that are used for deriving the secret data-carrier key from the secret basic key are not stored in the data carrier either, so that it is not possible to infer the secret basic key from the secret data-carrier key using such data—not present in the data carrier—either. Nevertheless, the data carrier still remains authenticatable via the static public data-carrier key associated with the secret basic key, for example using a certificate relating to the public data-carrier key, which can be stored in the data carrier in readable form.

In the case that the secret basic key corresponds to a secret group key that is employed as a secret basic key for a set or group of data carriers, a compromising of one data carrier of the group is disregardable for the remaining data carriers of the group, because there are no security-relevant data stored in the compromised data carrier that could endanger the security of the other data carriers of the group. Secret data-carrier keys of other, non-attacked data carriers of a group of data carriers can continue to be employed.

Doubts about the anonymity of the user of the data carrier that might arise from the possibility of each employment of the data carrier being associated uniquely with the corresponding user on the basis of the employed static public key, can be dispelled by employing a public group key as the static public data-carrier key. It is then not possible to track the data carrier on the basis of a public data-carrier key individual to the data carrier, because no such thing is present in the data carrier. The public data-carrier key employed is thus preferably a public group key which is not individual to the data carrier, but is identical for all data carriers of a set or group of data carriers. In this regard, all data carriers of a group are indistinguishable with regard to their public data-carrier key. Thus, the anonymity of the user can be maintained.

Preferably, before a further execution of the cryptographic method the secret data-carrier key of the data carrier is respectively replaced by a secret data-carrier session key of the data carrier that is derived from the secret data-carrier key. That is to say, the data carrier executes the method with a different secret data-carrier key upon each execution. The secret data-carrier key of the data carrier is thus configured as a secret session key of the data carrier.

A session key is always understood within the framework of the present invention to be a key that is newly determined for each "session", i.e. here, upon each carrying out of the cryptographic method. Different session keys are normally different, i.e. the value of a session key in a first session differs from the value of the session key of a subsequent second session. It is not possible to infer a subsequently employed session key from an earlier one, or vice versa. For example, the public terminal key and the secret terminal key of the terminal device are preferably always provided as a session key in this sense.

Therefore, it is equally impossible to track the user of the data carrier on the basis of the secret data-carrier key of the data carrier. A secret data-carrier key of the data carrier could also be used in another, known way, for example in a challenge-response method for authenticating to a data processing device. However, since according to the present invention the secret data-carrier key is a session key, i.e. has a different value upon each use, the identity of the data carrier cannot be inferred from the secret data-carrier key alone. Thus, the anonymity of the user can also be maintained in this regard.

Through the additional employment of the authentication parameter, which is checked by the terminal device within the framework of the method according to the invention, the security of the method can be improved further. If the correct authentication parameter is supplied to the terminal device, it can be assumed that the data carrier is in the hands of a legitimate user who intends to carry out the cryptographic method between the data carrier and the terminal device. Unintended or unwanted carrying out of the method, for example by contactless means and without the knowledge or consent of the user of the data carrier, can be safely ruled out.

Through the combination of the employment of the authentication parameter with the employment of a static public data-carrier key there can be obtained in one common method the advantages of password-based methods and the advantages of those methods allowing a, for example, certificate-based authentication of the data carrier to the terminal device on the basis of the static public data-carrier key. This enables resources, in particular computing time, to be saved to a considerable extent. Those method steps that are common to known methods, for example agreeing on a common secret communication key, are carried out only once according to the invention.

A portable data carrier according to the invention comprises a processor, a memory and a data communication interface to a terminal device as well as a cryptography device. The latter is adapted to carry out a cryptographic method with a terminal device while employing a public data-carrier key and a secret data-carrier key of the data carrier as well as a public terminal key and a secret terminal key of the terminal device. The cryptography device is further adapted to encrypt or digitally sign a session parameter of the method by means of an authentication parameter different from the data-carrier keys.

Preferably, the cryptography device is further adapted to respectively replace the secret data-carrier key of the data carrier by a secret data-carrier session key of the data carrier that is derived from the secret data-carrier key. In this way, each carrying out of the authentication method can be effected with a session-specific secret data-carrier key of the data carrier, as described.

A terminal device according to the invention for data communication with a portable data carrier according to the invention is adapted to carry out a cryptographic method with a portable data carrier while employing a public data-carrier key and a secret data-carrier key of the data carrier as well as a public terminal key and a secret terminal key of the terminal device. The terminal keys are preferably configured respectively as a session key. The terminal device is adapted to check an authentication parameter associated with the data carrier and different from the data-carrier keys within the framework of the cryptographic method.

The terminal device is adapted to receive the authentication parameter in a suitable manner, as described hereinabove, for example via an input device or an optical read-out device.

The checking of the authentication parameter can be effected in particular by the terminal device decrypting or verifying an encrypted or digitally signed session parameter supplied by the data carrier. The encryption or signature is based here on the authentication parameter. The correctness of the received authentication parameter can be checked by the terminal device in the course of the method for example by the consistency of values derived from the session parameter, for example a communication key negotiated with the data carrier.

A system according to the invention comprises a data carrier according to the invention as well as a terminal device according to the invention. The latter are respectively adapted to carry out a cryptographic method according to the invention.

Within the framework of the method a communication key is agreed on between the data carrier and the terminal device by means of the public data-carrier key and the secret data-carrier key of the data carrier as well as the public terminal key and the secret terminal key of the terminal device. This communication key is then present only with these two parties. It is a secret communication key in this sense. Such a key agreement can be effected for example by means of a Diffie-Hellman key exchange method. Other, comparable methods are likewise usable. The agreeing on the communication key can be regarded as a form of implicit authentication between the data carrier and the terminal device. If a subsequent data communication between the data carrier and the terminal device that is encrypted by means of the agreed on communication key can be effected successfully for both sides, each party deems the other party to be successfully authenticated.

Preferably, the public data-carrier key of the data carrier is verified by the terminal device by means of a certificate of the public data-carrier key. For this purpose, the corresponding certificate of the terminal device can be made available by the data carrier in a suitable manner. The data carrier can send the certificate to the terminal device, for example. It is also possible to hold the certificate in a freely readable memory area of the data carrier. The step of verifying the certificate can be regarded as part of an authentication method wherein the data carrier identifies itself to the terminal device by means of the certificate. In the case that the public data-carrier key is individual to the data carrier, the data carrier can be authenticated uniquely by the terminal device. If the public data-carrier key employed is a public group key, the data carrier can be authenticated at least as a data carrier of the group associated with the corresponding group key pair, but not on the basis of a certificate individual to the data carrier, which in this case is not provided.

In the same way, the terminal can identify itself to the data carrier by means of a similar certificate.

Preferably, the secret data-carrier key of the data carrier is derived from the secret basic key while employing a first random number. For this purpose, there can be employed any suitable operation that can take up as input data—inter alia—the secret basic key as well as the first random number and process them into the secret data-carrier key individual to the data carrier. For example, there can be used mathematical operations, such as multiplication, exponentiation or the like. Deriving the secret data-carrier key from the secret basic key can be effected for example during the manufacture of the data carrier, e.g. in the personalization phase, preferably outside the data carrier. The secret data-carrier key of the data carrier is then stored in the data carrier. The public data-carrier key and the certificate relating to this key can also be incorporated into the data carrier in this phase. However, it is also possible that the generating of the secret data-carrier key is carried out in the data carrier itself. In so doing, the secret basic key initially stored in the data carrier for this purpose is overwritten by the generated secret data-carrier key, and is thus no longer stored in the data carrier. The random number temporarily stored in the data carrier for generating the secret data-carrier key is likewise deleted as soon as the secret data-carrier key has been generated.

The secret data-carrier session key of the data carrier which respectively replaces the current secret data-carrier key of the data carrier after an execution of the cryptographic method can be derived from the current secret data-carrier key in different ways. The derivation is effected in the data carrier. Since the original secret data-carrier key has been derived from the secret basic key, and each data-carrier session key of the data carrier is derived from the respective current secret data-carrier key of the data carrier—which it then replaces—each secret data-carrier session key of the data carrier is also derived indirectly from the secret basic key. However, it is not possible to infer the secret basic key from a secret data-carrier session key of the data carrier.

A replacing of the secret data-carrier key by the derived secret data-carrier session key of the data carrier can be effected for example such that the secret data-carrier key is "overwritten" by the derived data-carrier session key, i.e. the secret data-carrier key assumes the value of the derived data-carrier session key. The preceding value of the secret data-carrier key is deleted. That is to say, the data carrier always has "that" secret data-carrier key that is employed in the method according to the invention. However, the value of the secret data-carrier key changes between two executions of the method. The data carrier thus respectively has a session-specific secret data-carrier key.

The derivation of the secret data-carrier session key from the current secret data-carrier key is effected on the basis of a session parameter.

According to a first embodiment, the secret data-carrier session key of the data carrier can be derived from the secret data-carrier key while employing a random number. That is to say, the random number represents the corresponding session parameter. For each derivation of a data-carrier session key of the data carrier, a new random number is respectively employed. The random number can be generated in the data carrier. After said deriving, the random number is deleted. This makes it impossible to infer from the derived data-carrier session key the secret data-carrier key employed for derivation.

According to an alternative embodiment, the session parameter can be determined in dependence on a value supplied by the terminal device. This value can assume for example the form of a public sector key of the terminal device and be supplied to the data carrier after a successful authentication between data carrier and terminal. This sector key is now used for deriving the secret data-carrier session key in a suitable manner in the data carrier.

For deriving the secret data-carrier session key of the data carrier there can of course also be employed several session parameters, i.e. for example a random number and a terminal parameter.

According to a preferred embodiment, the public data-carrier key is determined by exponentiating a specified primitive root by the secret basic key. The original secret data-carrier key is then formed, in this embodiment, by multiplying the secret basic key by a first random number. Finally, a first base of the data carrier is formed by exponentiating the primitive root by the reciprocal of the first random number.

A secret data-carrier session key of the data carrier is then determined, if necessary, by multiplying the current secret data-carrier key by a session parameter. A session base is determined by the data carrier by exponentiating the first base by the reciprocal of the session parameter. The computation of a session base is effected just like the computation of a secret data-carrier session key for preparing a further carrying out of the cryptographic method. The session parameter can, as mentioned, be specified for example by a second random number or in dependence on a parameter of the terminal device. The secret data-carrier key of the data carrier is then replaced by the secret data-carrier session key of the data carrier in the described way. In the same way, the first base is replaced by the session base, i.e. the value of the first base is replaced by the value of the session base. Thus, the first base of the data carrier can also be regarded as session-specific, like the secret data-carrier key.

The first base, i.e. its current value, is supplied to the terminal device by the data carrier in a specified manner. According to a first embodiment, the first base is encrypted as a session parameter by the data carrier by means of the authentication parameter, and supplied to the terminal device in an encrypted manner. According to a second embodiment, it is possible that the data carrier digitally signs the first base on the basis of the authentication parameter before said base is supplied to the terminal device. Supplying can mean here for example sending or holding so as to be freely readable.

The terminal device then determines its public terminal key by exponentiating the first base, supplied by the data carrier, by the secret terminal key of the terminal device. The secret terminal key of the terminal device is respectively generated session-specifically by the latter. The first base is previously decrypted or verified by the terminal device on the basis of the authentication parameter.

Finally, the terminal device sends the public terminal key determined as described to the data carrier.

Thus, the data necessary for agreeing on the communication key have been exchanged between the data carrier and the terminal device. The data carrier computes the communication key for its part by exponentiating the received public terminal key of the terminal device by its own secret key. The terminal device determines the communication key for its part by exponentiating the public data-carrier key by its own secret terminal key of the terminal device.

Subsequently—or alternatively before agreeing on the communication key—the terminal device can check the public data-carrier key of the data carrier by means of the certificate supplied by the data carrier therefor, as mentioned, according to this embodiment as well.

According to an alternative embodiment of the method according to the invention, the data carrier employs as a public data-carrier key, instead of the static public key, a public key generated dynamically per session. That is to say, the data carrier employs a dynamically generated key pair upon each carrying out of the cryptographic method. In so doing, a public data-carrier key and a secret data-carrier key of the data carrier are generated in the data carrier session-specifically. According to this embodiment, the data carrier always supplies to the terminal device as a session parameter, as described hereinabove, a base value derived from a specified primitive root and previously encrypted by the data carrier by means of the authentication parameter. Otherwise, the method of this second embodiment proceeds as described hereinabove with reference to the first embodiment.

Unlike known cryptographic methods providing a password-based authentication, the present method does not involve encrypting an arbitrary random number or the like as a session parameter by means of the authentication parameter and supplying it to the terminal device. Here, according to the invention, the base value derived from the primitive root serves as a session parameter. This has the advantage that the primitive root—as the generating element of a multiplicative subgroup—can be used in the data carrier directly within the framework of the subsequent key exchange method. Inside the data carrier no further computations are required for this purpose, nor is there any need for additional communication with the terminal device. According to the prior art, there must first be derived from the random number transferred in encrypted form as a session parameter there, in the data carrier—and the terminal device—by means of an elaborate computation, a suitable base value, which can then be employed within the framework of the key derivation. Besides the computation, this requires further communication with the terminal device for exchanging a further parameter which is required for deriving the base value. Therefore, the present method according to the second embodiment can be carried out in a much more efficient and resource-saving manner in comparison to known, similar methods, without security losses. This is advantageous particularly with regard to the always scarce resources in portable data carriers.

Upon the dynamic generation of the key pair in the data carrier, a secret basic key is preferably generated dynamically per session. As a dynamically generated public data-carrier key there is then employed a public key which is determined by exponentiating the specified primitive root by the dynamically generated secret basic key. The secret data-carrier key is finally formed by multiplying the secret basic key by a random number. The base value results by exponentiating the primitive root by the reciprocal of the random number. The derivation of the keys of the terminal device can be effected precisely as described with reference to the first embodiment.

BRIEF DESCRIPTION OF THE DRAWINGS

Hereinafter the invention will be described by way of example with reference to the attached drawings. Therein are shown.

DETAILED DESCRIPTION OF PREFERRED EMBODIMENTS

Figure 1:
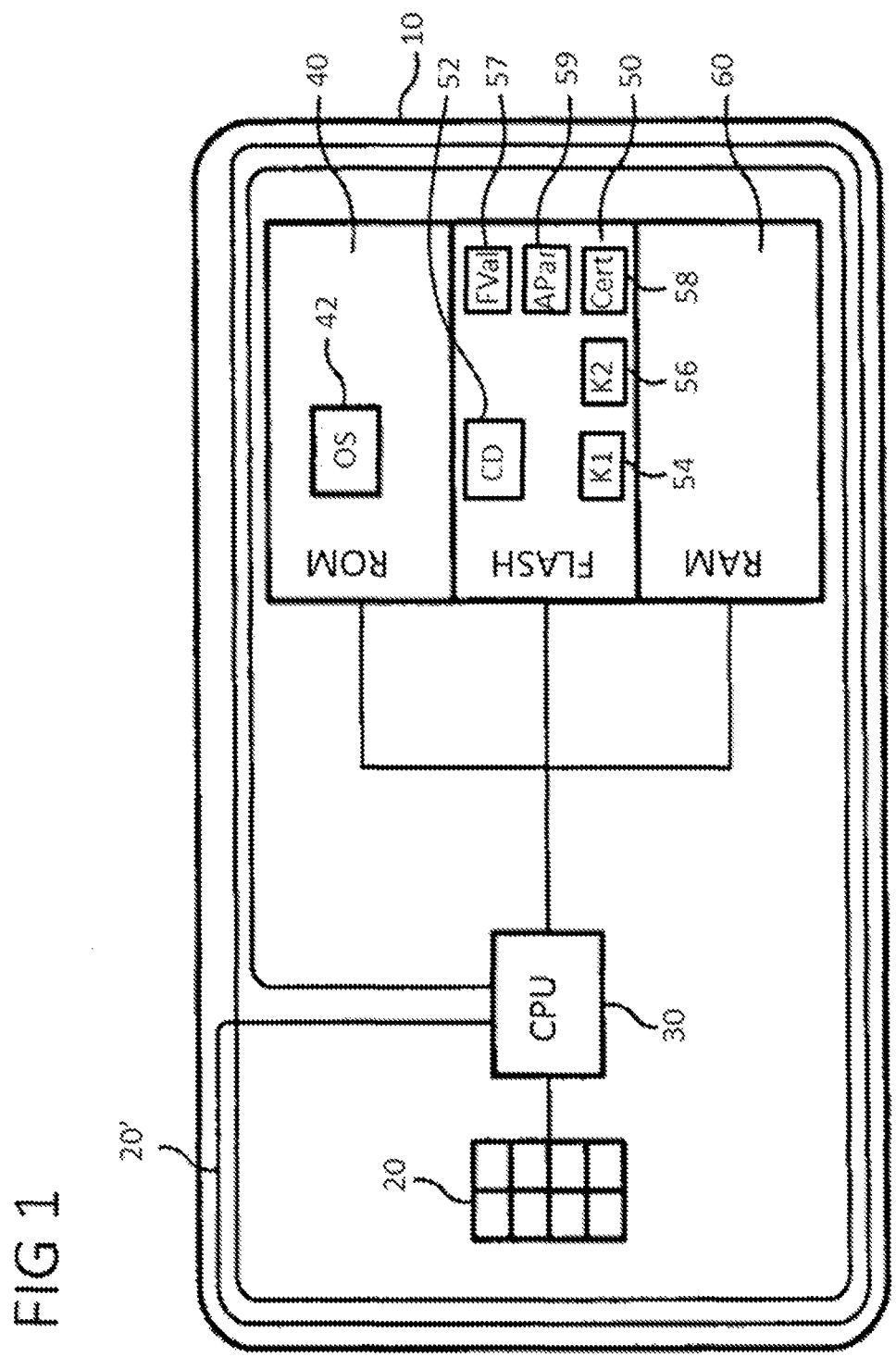
FIG. 1 a schematic view of a preferred embodiment of a data carrier according to the invention, FIGS. 2 and 3 steps of a first preferred embodiment of the method according to the invention between the data carrier from FIG. 1 and a terminal device, and FIG. 4 additional steps of the method from FIGS. 2 and 3 for supplying session-specific data-carrier parameters.

With reference to FIG. 1, a data carrier 10, which is represented as a chip card here, comprises data communication interfaces 20, 20', a processor 30 as well as different memories 40, 50 and 60. The data carrier 10 can also be present in a different design.

As data communication interfaces 20, 20' the data carrier 10 comprises a contact pad 20 for contact-type data communication as well as an antenna coil 20' for contactless data communication. Alternative data communication interfaces may be provided. It is further possible that the data carrier 10 only supports one kind of data communication, i.e. only contact-type or contactless.

The non-volatile, non-rewritable ROM memory 40 comprises an operating system (OS) 42 of the data carrier 10, which controls the data carrier 10. At least parts of the operating system 42 can also be stored in the non-volatile, rewritable memory 50. The latter can be present for example as a flash memory.

The memory 50 comprises a cryptography device (CD) 52 by means of which a cryptographic method can be carried out between the data carrier 10 and a terminal device (not shown). In so doing, the keys (K1, K2) 54, 56 likewise stored in the memory, a further value (FVal) 57 as well as a digital certificate (Cert) 58 find their application. Finally, an authentication parameter (APar) 59 is stored in the data carrier 10. The manner of functioning of the cryptography device 52 as well as the role of the keys 54, 56, of the value 57, of the authentication parameter 59 and of the certificate 58 within the framework of a cryptographic method will be described more precisely with reference to FIGS. 2 and 3. The memory 50 can contain further data, for example data relating to a user.

The volatile, rewritable RAM memory 60 serves the data carrier 10 as a working memory.

The data carrier 10 can, if it is an electronic identity document for example, comprise further features (not shown). These can be applied, for example imprinted, visibly on a surface of the data carrier 10, and designate the user of the data carrier, for example by his name or a photo. According to an embodiment which will be described more precisely hereinafter, it is possible that the authentication parameter 59 is not only stored in the data carrier 10, for example in the form of a PIN or the like, but is additionally applied, e.g. imprinted, on the data-carrier surface so as to be optically readable.

Figure 2:
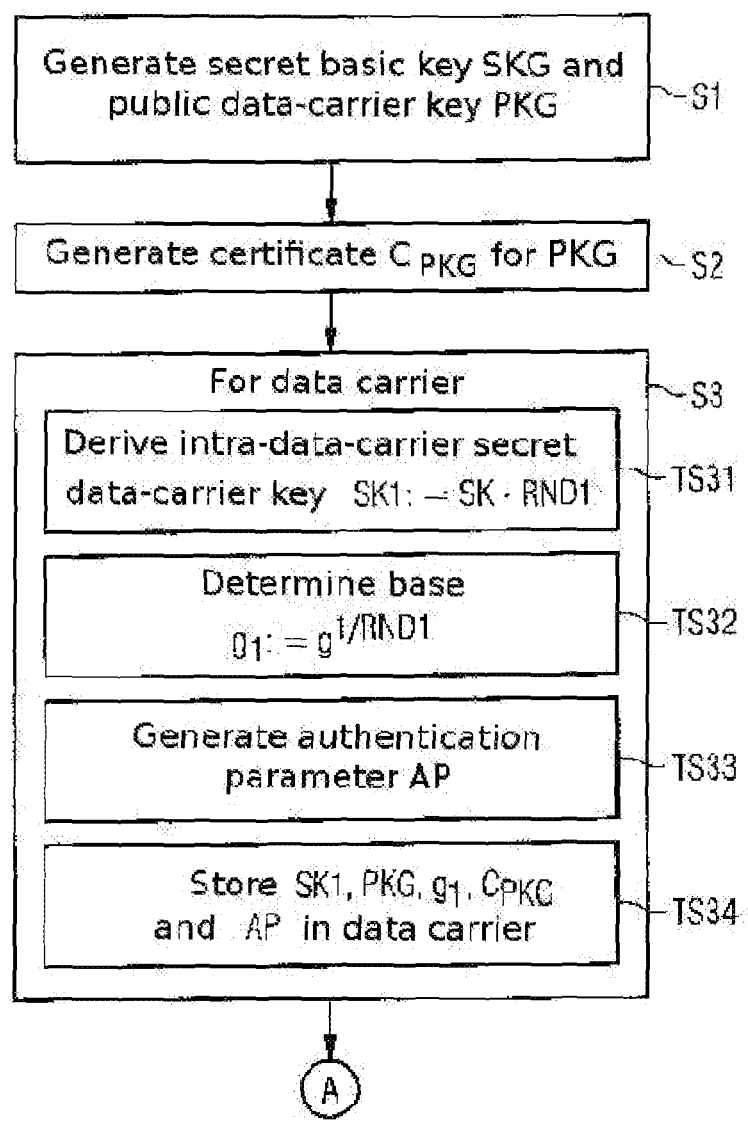
Figure 3:
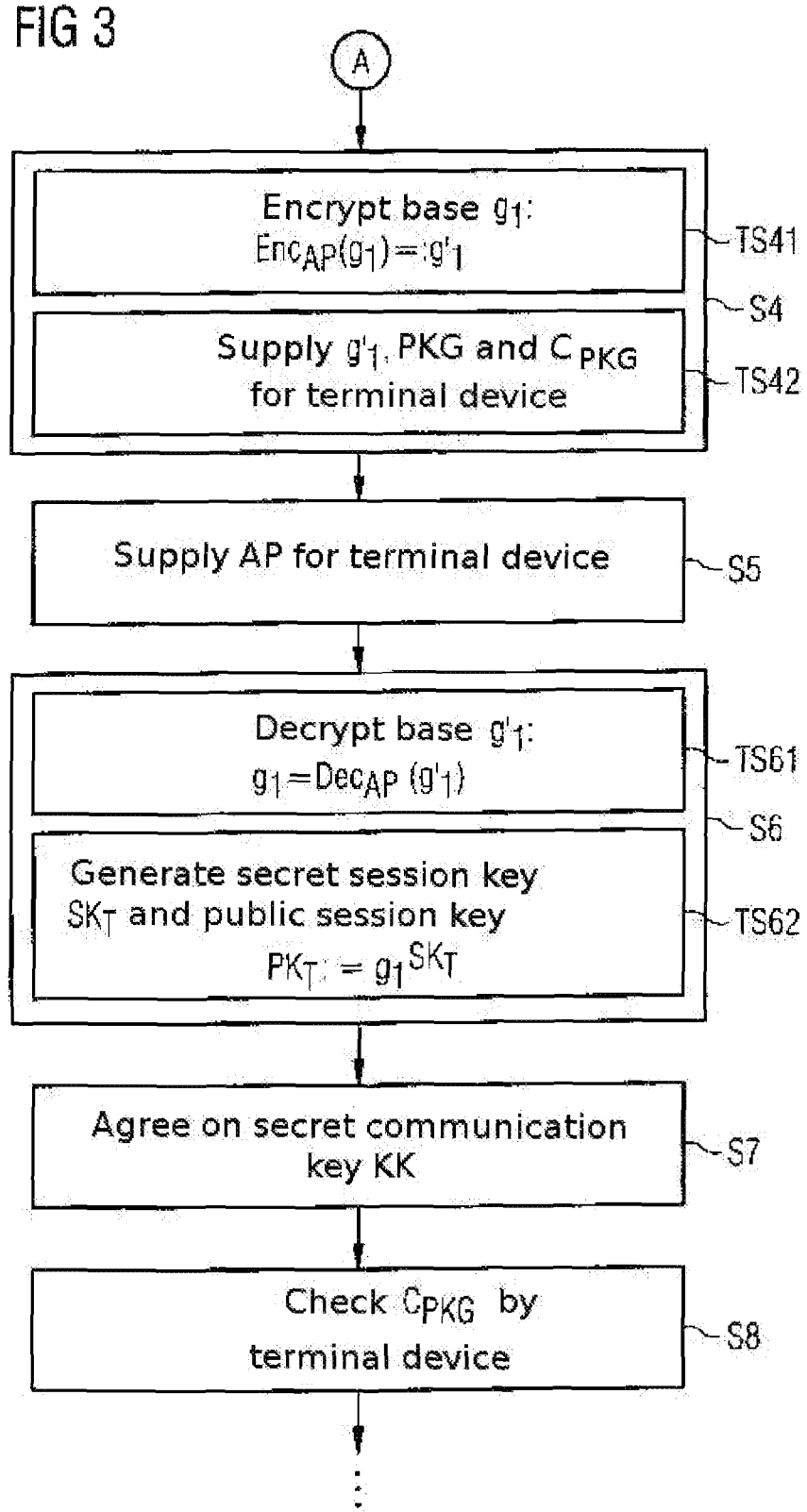

With reference to FIGS. 2 and 3, an embodiment of the cryptographic method between the data carrier 10 and a terminal device will now be described more precisely. FIG. 2 shows preparatory steps. These can be carried out for example during the manufacture of the data carrier 10, for instance in a personalization phase.

In a first step S1 a secret basic key SKG as well as a public data-carrier key PKG are formed. The secret basic key SKG can be configured as a secret group key which is common to a set or group of data carriers 10. The secret basic key as well as the public data-carrier key PKG are static, i.e. associated with the data carrier 10 for its total life.

The public data-carrier key PKG is computed as the result of exponentiating a specified primitive root g modulo a specified prime number p. All computations described hereinafter are to be read modulo the prime number p, without this always being explicitly stated. The two keys SKG and PKG form a data-carrier key pair and constitute a basis for the hereinafter described method.

At this point it should be noted that all computations, i.e. multiplications and exponentiations, that are presented within the framework of the present invention can be carried out not only over a group of primitive residue classes modulo p, but over an arbitrary group (understood here as a mathematical structure and not to be confused with the above-mentioned group of data carriers), for example also on the basis of elliptical curves.

In step S2 there is formed a certificate $C_{PKG}$ which serves for verification of the public data-carrier key PKG.

Step S3 takes place during the personalization of the data carrier 10. Here, the data carrier 10 is equipped with a data-carrier key pair. The public data-carrier key PKG serves the data carrier 10 as a public key. A secret data-carrier key SK1 of the data carrier 10 is derived from the secret basic key SKG in a randomized manner, i.e. employing a random number RND1.

In this way, if the secret basic key is a secret group key, each data carrier 10 of the group is equipped with a key pair that differs from a corresponding key pair of another data carrier of the group—due to the randomized component upon the key derivation—by respective different secret data-carrier keys SK1. On the other hand, all data carriers 10 of the group comprise the same public data-carrier key PKG, in the case that SKG is a secret group key, due to the hereinabove described derivation of the public data-carrier key. Further, all secret data-carrier keys of the group of data carriers have been derived from the same secret group key in this case.

However, if the secret basic key SKG is not a group key, i.e. an individual secret basic key is supplied for each data carrier 10, each data carrier 10 also comprises a static, but individual, public data-carrier key PKG.

In substep TS31 a secret data-carrier key SK1 individual to the data carrier is derived by multiplying the secret basic key SKG by the random number RND1.

In a further step TS32 a first base g1 is computed, starting out from the primitive root g. In so doing, the primitive root g is exponentiated by the reciprocal of the random number RND1 which was already employed for determining the secret key: $g1:=g\hat{\ }(1/RND1)$. The reciprocal 1/RND1 of the random number RND1 forms here the multiplicative inverse of the random number RND1 with regard to the multiplication modulo the prime number p.

In substep TS33 an authentication parameter AP is generated. This serves, as described hereinafter with reference to FIG. 3, for a password-based authentication within the framework of the cryptographic method. The authentication parameter AP can be generated or supplied in an arbitrary, suitable form, for example as a secret datum in the form of a PIN, as a key for a symmetric encryption method (AES, TDES, DES, etc.) or the like. It is likewise possible to generate as an authentication parameter AP a biometric feature of a later user of the data carrier 10, for example a fingerprint or the like. Finally, there can also be used as an authentication parameter AP a data-carrier feature individual to the data carrier 10, for example an MM feature. "MM" stands here for "modulated machine-capable" (feature), a secret machine-readable substance incorporated in the data-carrier body.

The keys SK1 and PKG are stored in the data carrier 10 together with the base g1, the certificate $C_{PKG}$ and the authentication parameter AP in substep TS34. The authentication parameter AP is for this purpose suitably digitized, where applicable. This holds for example when a biometric feature is generated as an authentication parameter AP. Also in the case of an MM feature as an authentication parameter, the "message" coded machine-readably by means of this feature is stored digitally in a memory of the data carrier 10 again. The data carrier 10 requires the authentication parameter AP, as described hereinafter, to encrypt or digitally sign data therewith.

Where applicable, the authentication parameter AP, as is already the case with regard to the MM feature, can be applied to the data carrier such that this parameter can be machine-read by a terminal device in an optical or other manner when the data carrier is suitably presented to the terminal device. For example, a PIN serving as an authentication parameter AP can thus also be applied, e.g. imprinted, on a data-carrier body of the data carrier 10 so as to be optically readable, in addition to being stored in a memory 50 of the data carrier 10. What is important here is only that the machine readout can take place only when the user of the data carrier intends and allows it, i.e. not for example by contactless means without being recognized.

The random number RND1 is not stored in the data carrier 10, nor is the secret basic key SKG.

The data carrier 10 is thus adapted to carry out a cryptographic method with a terminal device by means of the data carrier's cryptography device 52, as described more precisely with reference to FIG. 3.

In step S4 the data carrier 10 supplies to the terminal device the data necessary for carrying out the cryptographic method (cf. substep TS42). For agreeing on a communication key KK the terminal device requires the base g1 as well as the public group key PKG, in the represented embodiment. For verifying the same the terminal device requires a corresponding certificate $C_{PKG}$.

The base g1, however, before it is supplied to the terminal device as a session parameter, is encrypted in the data carrier 10 by means of the authentication parameter AP in substep TS41. Alternatively, the base g1 can also be digitally signed by means of the authentication parameter g1. In this way a password-based authentication can be integrated into the method in a simple manner, as described hereinafter.

The described parameters of the data carrier 10 can be sent by the data carrier 10 to the terminal device in substep TS42. It is also possible that these values are stored in a freely readable memory area of the data carrier 10 and read out by the terminal device as needed.

In step S5 the authentication parameter AP is supplied externally to the terminal device, which requires it for checking or authentication purposes. According to one variant, the authentication parameter can be input to the terminal device by a user of the data carrier via an input device. A PIN can be input for example via a keyboard or the like, a fingerprint via a suitable sensor. Alternatively, the user of the data carrier can also present the same to the terminal device suitably such that an authentication parameter applied to the data carrier can be machine-read by the terminal device, for example a hereinabove described MM feature or a PIN imprinted on the data-carrier body.

In step S6 the terminal device prepares the cryptographic method for its part. In substep TS61 the terminal device decrypts the encrypted base g1' on the basis of the authentication parameter AP received in step S5, to obtain therefrom the base g1. In the case that the data carrier has supplied the base g1 to the terminal device in digitally signed form in substep TS42, the terminal device verifies the signature on the basis of the authentication parameter AP accordingly in substep TS61.

The check of the authentication parameter AP by the terminal device, and thus the authentication of the user of the data carrier 10 or of the data carrier 10 itself, is effected with the verifying of the signature in substep TS61, in the case that the base g1 has been digitally signed by the data carrier 10 in substep TS41. If said verifying is successful, the authentication parameter is deemed successfully checked.

In the preferred alternative case that the base g1 has been encrypted by the data carrier 10 by means of the authentication parameter AP in substep TS41, the check of the authentication parameter AP is effected, on the one hand, upon decrypting the encrypted base g1. A further implicit checking step is then effected only later in the course of the method, namely by ascertaining—or not ascertaining—that the agreeing on a secret communication key KK (cf. step S7) was able to be carried out successfully. This fact can be ascertained by a symmetrically encrypted data communication between the data carrier 10 and the terminal device that is desired on the basis of the agreed on communication key KK actually being able to be carried out, i.e. by both parties being in possession of the same communication key KK. Only at this time does it become apparent that the first base g1 decrypted by the terminal device in substep TS61 on the basis of the authentication parameter AP received in step S5 corresponds to the base g1 that the data carrier 10 encrypted in substep TS41 by means of the authentication parameter AP stored in the data carrier 10. In this way it is possible to prevent special attacks, for example dictionary attacks on a password in the form of the authentication parameter.

It can be provided that, directly following the cryptographic method described here, further authentication methods are carried out between the data carrier 10 and the current or a further terminal device which is connected to the current terminal device, for example via a data communication network. In so doing, the data carrier can authenticate itself to the terminal device, and vice versa, in the known way. Because these methods also comprise a hereinafter described key exchange method, for example based on the well-known Diffie-Hellman method, the current terminal device can, if necessary, transmit the base g1 to the connected terminal device via a secure data transfer channel (e.g. via SSL). Corresponding authentication methods between the data carrier 10 and the corresponding terminal device can then be carried out as known.

In substep TS62 the terminal device then generates a secret terminal key $SK_T$. This can be done for example in a randomized manner. A public terminal key $PK_T$ of the terminal device is computed by the latter by exponentiating the base g1 supplied by the data carrier 10 in the described way by its own secret terminal key:

$$PK_T := g1^{\wedge SK_T}.$$

Optionally, the terminal device can validate g1 and/or $PK_T$, i.e. in particular check them for certain criteria. An attack on the secret terminal key $SK_T$ by means of skillfully chosen values for g1 can thus be recognized by the terminal, which can then abort the operation or refuse further communication.

The public session key $PK_T$ is supplied to the data carrier 10 by the terminal device, being sent thereto for example.

In the following step S7 the communication key KK is now agreed on concretely, as already indicated. The data carrier 10 computes this communication key KK by exponentiating the public terminal key $PK_T$ of the terminal device by its own secret key SK1:

$$KK_{DT} := PK_T^{\wedge SK1}$$

$$= (g1^{\wedge SK_T})^{\wedge SK1} \qquad (Def. \text{ of } PK_T)$$

$$= ((g^{\wedge}(1/RND1)^{\wedge SK_T})^{\wedge SK1} \qquad (Def. \text{ of } g1)$$

$$= ((g^{\wedge}(1/RND1)^{\wedge SK_T})^{\wedge (SKG*RND1)} \qquad (Def. \text{ of } SK1)$$

$$= (g^{\wedge}((1/RND1)^*SK_T{}^*SKG^*RND1) \qquad (Transformation)$$

$$= g^{\wedge}(SK_T{}^*SKG)$$

The terminal device computes the communication key KK by exponentiating the public data-carrier key PKG by the secret terminal key $SK_T$ of the terminal device:

$$KK_T := PKG^{\wedge SK_T}$$

$$= (g^{\wedge}SKG)^{\wedge SK_T} \qquad (Def. \text{ of } PKG)$$

$$= g^{\wedge}(SK_T{}^*SKG) \qquad (Transformation)$$

It is thus apparent that the data carrier 10 and the terminal device arrive at the same result due to the data respectively available to them. This holds, as described hereinabove, only when the terminal device obtains in substep TS61 as a result of the decryption precisely that value of the base g1 that was encrypted by the data carrier 10 in substep TS41. This, in turn, is the case precisely when the authentication parameter AP that was used for encrypting in the data carrier 10 matches the authentication parameter AP that was supplied to the terminal device in step S5. In other words, precisely when the password-based authentication method carried out on the basis of the authentication parameter AP was able to be carried out successfully between the data carrier 10 and the terminal device, as a part of the cryptographic method carried out between these parties.

In step S8 the terminal device finally checks the certificate $C_{PKG}$ of the public data-carrier key PKG. This check of the certificate can alternatively also be effected before agreeing on the communication key KK in step S7 and/or the secret session key $SK_T$ in step S6.

Thus, the cryptographic method between the data carrier 10 and the terminal device has been completed.

To prevent the data carrier 10 from being able to be identified and associated uniquely with a user upon subsequent, further authentications to the same or another terminal device by means of the method described by way of example, session-specific data-carrier parameters are supplied in the data carrier 10. This relates to the secret data-carrier key SK1 as well as the base g1. The latter is transferred to the terminal device or supplied thereto in a different way within the framework of the method, as described. An unchanged base g1 individual to the data carrier could thus be employed for identifying the data carrier 10. The same applies to a secret data-carrier key SK1 of the data carrier 10, if the latter were statically individual to the data carrier and were used for example within the framework of a challenge-response method.

Figure 4:
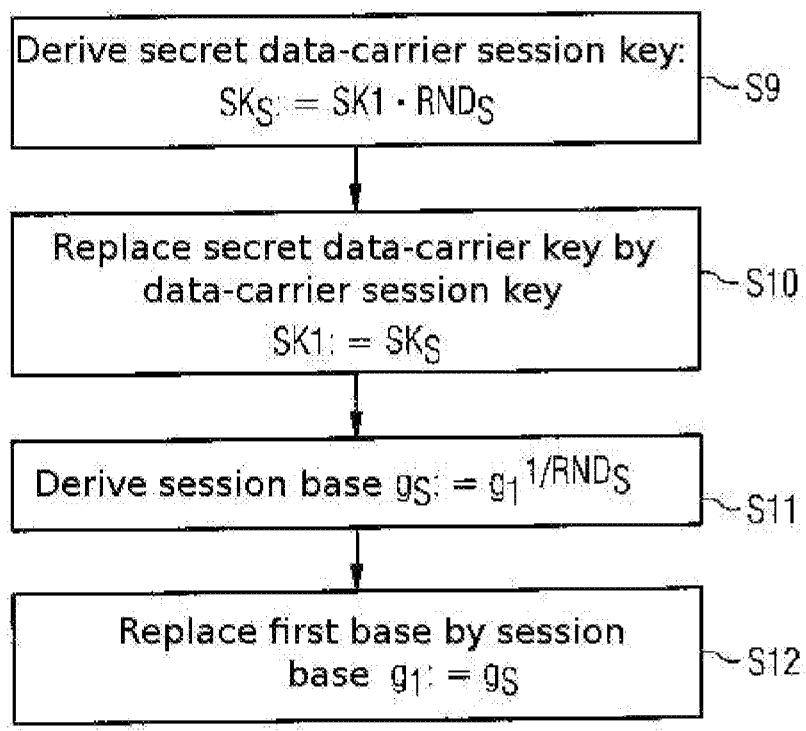

The intra-data-carrier generation of session-specific data-carrier parameters will hereinafter be described with reference to FIG. 4.

In step S9 there is shown the deriving of a secret data-carrier key $SK_S$ in the data carrier 10. For this purpose, a session parameter in the form of a random number $RNS_S$ is supplied in the data carrier 10. The current secret key SK1 is multiplied by the random number $RNS_S$, thereby deriving a secret data-carrier session key $SK_S$ of the data carrier 10:

$$SK_S := SK1{}^*RNS_S.$$

Subsequently, in step S10, the value of the current secret data-carrier key SK1 is replaced by the value of the data-carrier session key:

$$SK1 := SK_S.$$

Thus, the secret data-carrier key SK1 of the data carrier 10 is session-specific. There can be no tracking of the data carrier 10 on the basis of the secret data-carrier key SK1, because the latter changes in the described way between every two authentication methods carried out.

In the same way the base g1 is replaced, as shown in steps S11 and S12, by a session base $g_S$ ($g1 := g_S$), which is previously computed by exponentiating the base g1 by the reciprocal of the random number $RNS_S$: $g_S := g1^{\wedge}(1/RNS_S)$. Thus, the base g1 of the data carrier 10 is also always session-specific and there can be no tracking of the data carrier 10 on the basis of the base g1 transferred to the terminal device. The random number $RNS_S$ is subsequently deleted. An inferring of previous session parameters is thus likewise ruled out.

Instead of the random number $RNS_S$ or additionally thereto, another session parameter can also be employed. The latter can also depend on a value supplied by the terminal device, for example after a successful authentication to the data carrier 10. The corresponding session parameter is computed inside the data carrier in dependence on the value supplied by the terminal device. A thus computed session parameter can then be used for example instead of the random number $RNS_S$ employed in steps S9 and S11 for generating a secret session key or a session base and subsequently be deleted. Thus, the data carrier 10 possesses session-specific parameters for the next authentication method to be carried out.

According to a preferred embodiment, the terminal device makes available to the data carrier 10 a so-called public sector key $PK_{SEC}$. In dependence on the latter the data carrier 10 can then compute the current session parameter as described hereinafter.

The public sector key $PK_{SEC}$ here is part of a sector key pair ($PK_{SEC}$, $SK_{SEC}$), the corresponding secret sector key $SK_{SEC}$ not being available to the terminal device itself, but only to a higher-level blocking entity to which different terminal devices in different so-called sectors are subordinate. That is to say, the blocking entity manages different terminal devices in different sectors, for example different administrative districts or the like. In addition to the stated sector key pair ($PK_{SEC}$, $SK_{SEC}$) the data carrier 10 can also comprise a corresponding data-carrier sector key pair ($PKD_{SEC}$, $SKD_{SEC}$) which comprises a secret data-carrier sector key $SKD_{SEC}$ and a public data-carrier sector key $SKD_{SEC}$. The latter is stored in a database which the blocking entity can access. The stated sector keys serve to make a data carrier 10 identifiable by a terminal device at least within a sector. This identification can also be used by the blocking entity for blocking purposes.

The identification of the data carrier 10 is effected on the basis of a value $I_{SEC}$ agreed on between the terminal device and the data carrier 10. This value is computed by the terminal device supplying its public sector key $PK_{SEC}$ to the data carrier 10. The data carrier 10 derives a value therefrom by means of its secret data-carrier sector key $SKD_{SEC}$, for example as known from the Diffie-Hellman key exchange method. This value is then compressed by means of a hash function H and supplied to the terminal device. The terminal device compares the received value $I_{SEC}$ with a corresponding value that the terminal device has received from the blocking entity. Only the blocking entity is able to compute the value $I_{SEC}$ for its part in dependence on the public data-carrier sector key $PKD_{SEC}$ stored in the database, and on the secret sector key $SK_{SEC}$. The value $I_{SEC}$ is thus dependent on the sector as well as dependent on the data carrier 10. The blocking entity is in possession of all secret sector keys of the sectors subordinate thereto.

The value $I_{SEC}$ now serves within the data carrier 10 as a session parameter. That is to say, the computation of the secret session key $SK_S$ and the session base $g_S$ is effected analogously to steps S9 and S11 with $I_{SEC}$ instead of $RNS_S$.

It can now be provided to store the first base g1 in the data carrier 10 separately, e.g. as $g_B$. This base $g_B$ serves for checking purposes, as described hereinafter, and is not overwritten. Further, for each session i, i.e. for each carried out authentication method between the data carrier 10 and a terminal device, the public sector key $PK_{SEC;i}$ supplied by the terminal device can be stored in the data carrier 10 with reference to the session, i.e. the number i of the session in the effected order. This involves only public data. There is thus no security risk if these data are spied out. According to the method these data are readable only by the blocking entity when the data carrier 10 is presented thereto for checking. Instead of the public key, the identifier of the certifying body, e.g. according to ISO/IEC 7816-4 the Issuer Identification, can also be stored.

Because the blocking entity knows the public data-carrier sector key $PKD_{SEC}$—from the database—as well as all secret sector keys $SK_{SEC;i}$ for all sectors subordinate thereto, the blocking entity is able to determine a value $I_{SEC;i}$ which has been agreed on between the data carrier 10 and a terminal device of such a sector in a session i. In this way the blocking device can compute, and thus validate, the base $g_S$ currently present in the data carrier on the basis of the values stored in the data carrier 10, i.e. the base $g_B$ as well as the public sector keys $PK_{SEC;i}$ for each session i. For this purpose it is only necessary to associate with the respective public sector key $PK_{SEC;i}$ for the session i the corresponding value $I_{SEC;i}$ for this session i and finally reconstruct the computation of the current base $g_S$ by exponentiating the value $g_B$ (original g1) by the reciprocal of the product of the values $I_{SEC;i}$ for the individual sessions:

$$g_S := g_B^{\wedge}(1/(I_{SEC;1} * I_{SEC;2} * I_{SEC;3} \ldots * I_{SEC;n})).$$

In this way the blocking entity can check whether the data carrier 10 has actually employed the secret data-carrier sector key $SKD_{SEC}$ in the prescribed way for deriving the base $g_S$. If this were not the case, the base currently present in the data carrier would deviate from the base $g_S$ computed by the blocking entity. A forged data carrier 10 which is not in possession of the correct secret data-carrier sector key $SKD_{SEC}$ can in this way be clearly recognized by the blocking entity and subsequently blocked, where applicable.

The invention claimed is:

1. A cryptographic method between a portable data carrier and a terminal device using a public terminal key and a secret terminal key of the terminal device, the method comprising:
   in the portable data carrier, storing an authentication parameter, a public data-carrier key of the portable data carrier and a secret data-carrier key of the portable data carrier,
   wherein the public data-carrier key is a static public group key, and
   wherein the secret data-carrier key is a key unique for the portable data-carrier, the secret data-carrier key being derived from a secret group key, the secret group key and the static public group key being a group key pair, and
   in the portable data carrier, signing or encrypting a session parameter by means of the stored authentication parameter to enable a checking of a terminal supplied authentication parameter, being supplied to the terminal device via user input or via optical reading from the portable data carrier,
   wherein the public data-carrier key is determined by exponentiating a specified primitive root by the secret basic key, the secret data-carrier key is formed by multiplying the secret basic key by a first random number, and a first base value is formed by exponentiating the primitive root by the reciprocal of the first random number, and
   wherein a secret data-carrier session key of the portable data carrier is determined by multiplying the secret data-carrier key by the session parameter, and a session base is formed by exponentiating the first base by the reciprocal of the session parameter, the session parameter being specified by a second random number or a parameter of the terminal device, and the secret data-carrier key being replaced by the secret data-carrier session key, and the first base by the session base.

2. The method according to claim 1, wherein the terminal device checks the terminal supplied authentication parameter by decrypting the encrypted session parameter supplied by the portable data carrier being encrypted by means of the authentication parameter stored in the portable data carrier.

3. The method according to claim 1, wherein the terminal device checks the authentication parameter by verifying the signature of the session parameter supplied by the portable data carrier and digitally signed by means of the authentication parameter stored in the portable data carrier.

4. The method according to claim 1, wherein before a further execution of the cryptographic method the secret data-carrier key of the portable data carrier is replaced by a secret data-carrier session key of the portable data carrier that is derived from the secret data-carrier key.

5. The method according to claim 1, wherein a communication key is agreed on between the portable data carrier and the terminal device, preferably by means of a Diffie-Hellman key exchange method, by means of the public data-carrier key and the secret data-carrier key of the portable data carrier as well as the public terminal key and the secret terminal key of the terminal device.

6. The method according to claim 1, wherein the secret data-carrier key is derived from the secret basic key while employing a first random number.

7. The method according to claim 4, wherein the secret data-carrier session key of the portable data carrier is derived from the secret data-carrier key while employing the session parameter, there being supplied as the session parameter at least a second random number or a parameter of the terminal device.

8. The method according to claim 1, wherein the static public key employed as the public data-carrier key of the portable data carrier is verified by the terminal device by means of a certificate of the static public key.

9. The method according to claim 2, wherein the terminal device checks the terminal supplied authentication parameter by checking the consistency of a value derived from the session parameter.

10. A cryptographic method between a portable data carrier and a terminal device using a public terminal key and a secret terminal key of the terminal device, the method comprising:
   in the portable data carrier, storing an authentication parameter, a public data-carrier key of the portable data carrier and a secret data-carrier key of the portable data carrier,
   wherein the public data-carrier key is a static public group key, and
   wherein the secret data-carrier key is a key unique for the portable data-carrier, the secret data-carrier key being derived from a secret group key, the secret group key and the static public group key being a group key pair, and
   in the portable data carrier, signing or encrypting a session parameter by means of the stored authentication parameter to enable a checking of a terminal supplied authentication parameter, being supplied to the terminal device via user input or via optical reading from the portable data carrier,
   wherein the public data-carrier key is determined by exponentiating a specified primitive root by the secret basic key, the secret data-carrier key is formed by multiplying the secret basic key by a first random number, and a first base value is formed by exponentiating the primitive root by the reciprocal of the first random number,
   wherein the portable data carrier encrypts or digitally signs the first base by means of the authentication parameter, and supplies it to the terminal device in encrypted or digitally signed form as the session parameter,
   wherein the terminal device decrypts the encrypted first base or verifies the digitally signed first base on the basis of the authentication parameter, and determines the public terminal key of the terminal device by exponentiating the first base supplied by the portable data carrier as the session parameter by the secret terminal key of the terminal device.

11. A cryptographic method between a portable data carrier and a terminal device using a public terminal key and a secret terminal key of the terminal device, the method comprising:
   in the portable data carrier, storing an authentication parameter, a public data-carrier key of the portable data carrier and a secret data-carrier key of the portable data carrier,
   wherein the public data-carrier key is a static public group key, and
   wherein the secret data-carrier key is a key unique for the portable data-carrier, the secret data-carrier key being derived from a secret group key, the secret group key and the static public group key being a group key pair, and
   in the portable data carrier, signing or encrypting a session parameter by means of the stored authentication parameter to enable a checking of a terminal supplied authentication parameter, being supplied to the terminal device via user input or via optical reading from the portable data carrier,
   wherein the portable data carrier employs as the public data-carrier key, instead of the static public key, a public key generated dynamically per session, and encrypts as the session parameter by means of the authentication parameter a base value derived from a specified primitive root and supplies it to the terminal device,
   wherein per session a secret basic key is dynamically generated, there being employed as the dynamically generated public data-carrier key a public key that is determined by exponentiating the specified primitive root by the dynamically generated secret basic key, and the secret data-carrier key being formed by multiplying the secret basic key by a random number, and the base value being formed by exponentiating the primitive root by the reciprocal of the random number.

12. A portable data carrier comprising:
   a processor;
   a memory; and
   a data communication interface to a terminal device; and
   a cryptography device adapted to carry out a cryptographic method with the terminal device, wherein
   the portable data carrier stores an authentication parameter, a public data-carrier key of the portable data carrier, and a secret data-carrier key of the portable data carrier,
   wherein the public data-carrier key is a static public group key, and
   wherein the secret data-carrier key is a key unique for the data-carrier being, the secret data-carrier key being derived from a secret group key associated with the static public group key, and
   in the portable data carrier, a session parameter is signed or encrypted by means of the stored authentication parameter to enable a checking of terminal supplied authentication parameter, being supplied to the terminal via user input or via optical reading from the portable data carrier, by the terminal device, wherein the public data-carrier key is determined by exponentiating a specified primitive root by the secret basic key, the secret data-carrier key is formed by multiplying the secret basic key by a first random number, and a first base value is formed by exponentiating the primitive root by the reciprocal of the first random number, and wherein a secret data-carrier session key of the portable data carrier is determined by multiplying the secret data-carrier key by the session parameter, and a session base is formed by exponentiating the first base by the reciprocal of the session parameter, the session parameter being specified by a second random number or a parameter of the terminal device, and the secret data-carrier key being replaced by the secret data-carrier session key, and the first base by the session base.

13. A terminal device for data communication with the portable data carrier according to claim 12, wherein the terminal device is adapted to carry out a cryptographic method with the portable data carrier while employing the public data-carrier key and the secret data-carrier key of the portable data carrier as well as a public terminal key and a secret terminal key of the terminal device, wherein the terminal device is adapted to check the authentication parameter associated with the portable data carrier and different from the data-carrier keys.

14. The terminal device according to claim 13, wherein the terminal device is adapted to check the authentication parameter, and is adapted to determine its public terminal key while employing a base supplied by the portable data carrier as the encrypted or digitally signed session parameter, in combination with the secret terminal key of the terminal device.

15. A portable data carrier comprising:

a processor;

a memory; and a data communication interface to a terminal device; and a cryptography device adapted to carry out a cryptographic method with the terminal device, wherein the portable data carrier stores an authentication parameter, a public data-carrier key of the portable data carrier, and a secret data-carrier key of the portable data carrier, wherein the public data-carrier key is a static public group key, and wherein the secret data-carrier key is a key unique for the data-carrier being, the secret data-carrier key being derived from a secret group key associated with the static public group key, and in the portable data carrier, a session parameter is signed or encrypted by means of the stored authentication parameter to enable a checking of terminal supplied authentication parameter, being supplied to the terminal via user input or via optical reading from the portable data carrier, by the terminal device, wherein the public data-carrier key is determined by exponentiating a specified primitive root by the secret basic key, the secret data-carrier key is formed by multiplying the secret basic key by a first random number, and a first base value is formed by exponentiating the primitive root by the reciprocal of the first random number, wherein the portable data carrier encrypts or digitally signs the first base by means of the authentication parameter, and supplies it to the terminal device in encrypted or digitally signed form as the session parameter, and wherein the terminal device decrypts the encrypted first base or verifies the digitally signed first base on the basis of the authentication parameter, and determines the public terminal key of the terminal device by exponentiating the first base supplied by the portable data carrier as the session parameter by the secret terminal key of the terminal device.

16. A portable data carrier comprising:

a processor;

a memory; and a data communication interface to a terminal device; and a cryptography device adapted to carry out a cryptographic method with the terminal device, wherein the portable data carrier stores an authentication parameter, a public data-carrier key of the portable data carrier, and a secret data-carrier key of the portable data carrier, wherein the public data-carrier key is a static public group key, and wherein the secret data-carrier key is a key unique for the data-carrier being, the secret data-carrier key being derived from a secret group key associated with the static public group key, and in the portable data carrier, a session parameter is signed or encrypted by means of the stored authentication parameter to enable a checking of terminal supplied authentication parameter, being supplied to the terminal via user input or via optical reading from the portable data carrier, by the terminal device, wherein the portable data carrier employs as the public data-carrier key, instead of the static public key, a public key generated dynamically per session, and encrypts as the session parameter by means of the authentication parameter a base value derived from a specified primitive root and supplies it to the terminal device, and wherein per session a secret basic key is dynamically generated, there being employed as the dynamically generated public data-carrier key a public key that is determined by exponentiating the specified primitive root by the dynamically generated secret basic key, and the secret data-carrier key being formed by multiplying the secret basic key by a random number, and the base value being formed by exponentiating the primitive root by the reciprocal of the random number.

* * * * *